United States Patent
Andersson et al.

(10) Patent No.: US 10,288,438 B2
(45) Date of Patent: *May 14, 2019

(54) ROUTE PLANNING SYSTEM AND METHOD FOR MINIMIZING EXPOSURE TO THREATS

(71) Applicant: SAAB AB, Linkoeping (SE)

(72) Inventors: Ingmar Andersson, Linkoeping (SE); Magnus Brege, Linkoeping (SE)

(73) Assignee: SAAB AB, Linkoeping (SE)

( * ) Notice: Subject to any disclaimer, the term of this patent is extended or adjusted under 35 U.S.C. 154(b) by 67 days.

This patent is subject to a terminal disclaimer.

(21) Appl. No.: 14/993,876

(22) Filed: Jan. 12, 2016

(65) Prior Publication Data

US 2016/0123751 A1   May 5, 2016

Related U.S. Application Data

(63) Continuation of application No. 14/352,185, filed as application No. PCT/SE2011/051327 on Nov. 8, 2011, now Pat. No. 9,255,808.

(51) Int. Cl.
G01C 21/34   (2006.01)

(52) U.S. Cl.
CPC ......... *G01C 21/3461* (2013.01); *G01C 21/34* (2013.01); *G01C 21/3415* (2013.01)

(58) Field of Classification Search
CPC . G01C 21/3461; G01C 21/34; G01C 21/3415
See application file for complete search history.

(56) References Cited

U.S. PATENT DOCUMENTS

| 5,187,667 A | 2/1993 | Short |
| 5,526,260 A | 6/1996 | Kodet et al. |
| 5,631,640 A | 5/1997 | Deis et al. |
| 6,182,007 B1 | 1/2001 | Szczerba |
| 6,621,764 B1 | 9/2003 | Smith |
| 7,190,633 B2 | 3/2007 | Brinn et al. |
| 7,693,653 B2 * | 4/2010 | Hussain ................. G01C 21/20 340/995.14 |
| 7,848,879 B2 * | 12/2010 | Herman ............... G05D 1/0202 701/3 |

(Continued)

OTHER PUBLICATIONS

Marzouqi, Mohamed, and Ray A. Jarvis. "Covert path planning for autonomous robot navigation in known environments." Proc. Australasian Conference on Robotics and Automation, Brisbane. 2003. (Year: 2003).*

(Continued)

*Primary Examiner* — Alan D Hutchinson
(74) *Attorney, Agent, or Firm* — Alston & Bird LLP (57) ABSTRACT

The present invention relates to a system and method for route planning. The system is arranged to be mounted on a moving object. The system comprises a route planning module arranged to plan a route of the object upon request, wherein occasions of being visible from any point in the map within a shooting range during a predetermined time period is minimized. The system is characterized in that the route planning module is arranged to determine areas in the 3D map in which the object will be exposed to a potential threat during a predetermined time period based on line of sight calculations, and determining a re-planned route avoiding said potential threat areas.

14 Claims, 7 Drawing Sheets

(56) References Cited

U.S. PATENT DOCUMENTS

| | | | |
|---|---|---|---|
| 9,163,949 | B2 | 10/2015 | Brege et al. |
| 9,255,808 | B2 | 2/2016 | Andersson et al. |
| 2004/0030463 | A1 | 2/2004 | Stockdale et al. |
| 2005/0267652 | A1 | 12/2005 | Allstadt et al. |
| 2006/0044942 | A1 | 3/2006 | Brinn et al. |
| 2006/0116814 | A1 | 6/2006 | Milbert |
| 2008/0133070 | A1* | 6/2008 | Herman ............ G05D 1/0202 701/4 |
| 2010/0117896 | A1 | 5/2010 | Chu |
| 2010/0135120 | A1 | 6/2010 | Cecala et al. |
| 2011/0098914 | A1 | 4/2011 | Milbert et al. |
| 2011/0261193 | A1 | 10/2011 | Agurok et al. |
| 2012/0136567 | A1* | 5/2012 | Wang ............ G01C 21/3461 701/414 |
| 2012/0206335 | A1 | 8/2012 | Osterhout et al. |
| 2012/0206485 | A1 | 8/2012 | Osterhout et al. |
| 2012/0212399 | A1 | 8/2012 | Border et al. |
| 2012/0212400 | A1 | 8/2012 | Border et al. |
| 2012/0212406 | A1 | 8/2012 | Osterhout et al. |
| 2012/0212414 | A1 | 8/2012 | Osterhout et al. |
| 2012/0212484 | A1 | 8/2012 | Haddick et al. |
| 2012/0212499 | A1 | 8/2012 | Haddick et al. |
| 2012/0218301 | A1 | 8/2012 | Miller |
| 2013/0181047 | A1 | 7/2013 | Santini et al. |
| 2013/0206896 | A1 | 8/2013 | Dicander |
| 2014/0249744 | A1 | 9/2014 | Andersson et al. |
| 2014/0249745 | A1 | 9/2014 | Brege et al. |

OTHER PUBLICATIONS

Riley, Susan; A Shared View of the Battlespace; Mar. 2006; The Journal of Net-Centric Warfare (Year: 2006).*

Dempsey, Caitlin; Line of Sight in GIS; Apr. 2013; GISLounge.com (Year: 2013).*

International Searching Authority (ISA), International Search Report and Written Opinion for International Application No. PCT/SE2011/051327, dated Aug. 22, 2012, 5 pages, Swedish Patent and Registration Office, Sweden.

International Preliminary Examining Authority, International Preliminary Report on Patentability for International Application No. PCT/SE2011/051327, including Applicant's Aug. 15, 2013 Response to the ISA's Aug. 28, 2012 Written Opinion, completed Sep. 26, 2013, 12 pages, Swedish Patent and Registration Office, Sweden.

European Patent Office, Extended European Search Report for Application No. 11875359.9, dated Aug. 20, 2015, 15 pages, Germany.

United States Patent and Trademark Office, Office Action for U.S. Appl. No. 14/352,185, dated Jul. 30, 2014, 13 pages, USA.

United States Patent and Trademark Office, Office Action for U.S. Appl. No. 14/352,185, dated Nov. 19, 2014, 11 pages, USA.

United States Patent and Trademark Office, Notice of Allowance for U.S. Appl. No. 14/352,185, dated Sep. 30, 2015, 10 pages, USA.

* cited by examiner

ROUTE PLANNING SYSTEM AND METHOD FOR MINIMIZING EXPOSURE TO THREATS

CROSS-REFERENCE TO RELATED APPLICATIONS

This present application is a continuation of U.S. application Ser. No. 14/352,185, filed May 5, 2014; which is a national stage application, filed under 35 U.S.C. § 371, of International Application No. PCT/SE2011/051327, filed Nov. 8, 2011; the contents of both of which as are hereby incorporated by reference in their entirety.

BACKGROUND

Technical Field

The present invention relates to a system and a method for re-route planning.

Related Art

There is known in the art for route planning and re-route planning.

U.S. Pat. No. 7,848,879 shows a system for determining a course of action for an aerial vehicle. The system handles different type of threats. The threats are related to a predetermined threshold time for maximum safe visibility by a vehicle. The system is arranged to detect threats, to store a planned route for the vehicle, to determine types of threats detected and to utilize the predetermined threshold times for each threat detected by the vehicle to determine whether the planned route may safely enter visibility range of each threat detected by the vehicle and to determine a first elapsed time that the planned route brings the vehicle within the visibility range of a first threat detected by the vehicle.

BRIEF SUMMARY

One object of the present invention is to enable improved route planning.

This has in accordance with one example been achieved by means of a system for route planning arranged to be mounted on a moving object. The system comprises a route planning module arranged to plan a route of the object upon request, wherein occasions of being visible from any point in the map within a shooting range during a predetermined time period is minimized. The route planning module is arranged to determine areas in the 3D map in which the object will be exposed to a potential threat during a predetermined time period based on line of sight calculations, and determining a re-planned route based on exposure to said potential threat areas.

In one option, the system further comprises a communication module arranged to transmit firing area data to other objects and/or to receive firing area data from other objects.

In one option, the route planning module is arranged to receive information related to identified threat areas from the communication module and to calculate the re-planned route based on these identified areas. The identified threat areas may comprise the firing areas.

In one option, the route planning module is arranged to determine safe areas in the 3D map in which the object will be exposed during a predetermined time period from a safe location in the map, and determining a re-planned route based on said safe areas.

In one option, the system comprises a position module and a firer location estimation module. The position module is arranged to register the present position of the moving object at the request and to determine the travel path of the moving object during a predetermined time period preceding the request, wherein the present position represents a target position for firing. The firer location estimation module is arranged to estimate the location of a firer based on the registered position and the determined travel path and based on map data comprising 3D geographical coordinate data. The route planning module is then arranged to plan a route of the object based on the determined location of the firer.

In one option, the moving object is a ground based object.

In one option, the moving object is a vehicle.

In one option, the firer location estimation module is arranged to estimate the location of the firer based on line of sight calculations using the assumption that the object has been visible to the threat substantially during the whole predetermined time period.

In one option, the route planning module is arranged to determine a firing area reachable from the estimated firer location based on the 3D map data and line of sight calculations, and to plan the route so as to avoid said firing area.

In one option, the route planning module is arranged to re-plan the route based on the extent of the firing area and based on the 3D map data.

In accordance with one example, the invention also relates to a method for re-route planning for an object moving according to a route to a planned destination. The method comprises the steps of determining potential threat areas in a 3D map in which the object will be exposed to a potential threat during a predetermined time period based on line of sight calculations, and determining a re-planned route based on said potential threat areas.

In one option, the method comprises a step of determining threat areas in which the object will be exposed to an identified threat during a predetermined time period, and determining a re-planned route based on said threat areas.

In one option, the calculation of the re-planned route comprises determining safe areas in the map in which the object will be exposed during a predetermined time period from a safe location in the map, and determining a re-planned route based on said safe areas.

In one option, the re-route planning is based on terrain constraints such as hills, rivers, forests or other obstacles which may prevent the object from moving unhindered.

In one option, the re-planned route is calculated based on time constraints.

A computer program comprises a program code for re-route planning for an object moving according to a route to a planned destination. The computer program comprises the steps of determining potential threat areas in a 3D map in which the object will be exposed to a potential threat during a predetermined time period based on line of sight calculations, and determining a re-planned route based on said potential threat areas.

A computer program product may comprise a program code stored on a computer readable media for re-route planning for an object moving according to a route to a planned destination. The computer program is arranged to execute the steps of determining potential threat areas in a 3D map in which the object will be exposed to a potential threat during a predetermined time period based on line of sight calculations, and determining a re-planned route based on said potential threat areas, when said computer program is run on a computer.

DETAILED DESCRIPTION OF VARIOUS EMBODIMENTS

Figure 1:
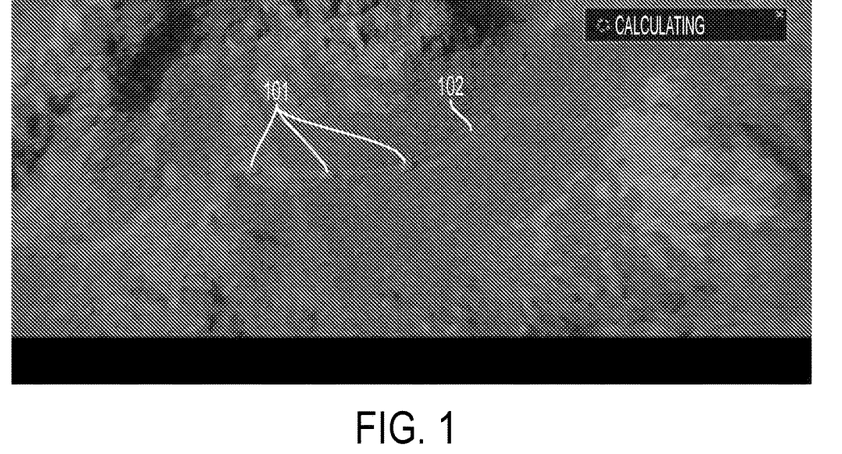
FIG. 1 illustrates the topology of a terrain with a vehicle moving along a path in the terrain.

In FIG. 1, at least one object 101 is moving in a terrain. The object may be a vehicle. The vehicle may for example be a ground based vehicle such as heavy vehicles. The heavy vehicle may for example be a truck, a bus or a tank or a ground based unmanned vehicle. The ground based vehicle may also be a car, a motor bike etc. The vehicle may also be an aerial vehicle such as a military or commercial aircraft, an Unmanned Aerial Vehicle (UAV), a helicopter etc. The moving object may be a person. The moving object may be moving into unknown territories with no personal knowledge about the terrain, roads, hostile military forces etc. In FIG. 1, more than one vehicle is illustrated. The positions for one of the objects during a predetermined time period preceding the current time are marked as a path 102.

Figure 11:
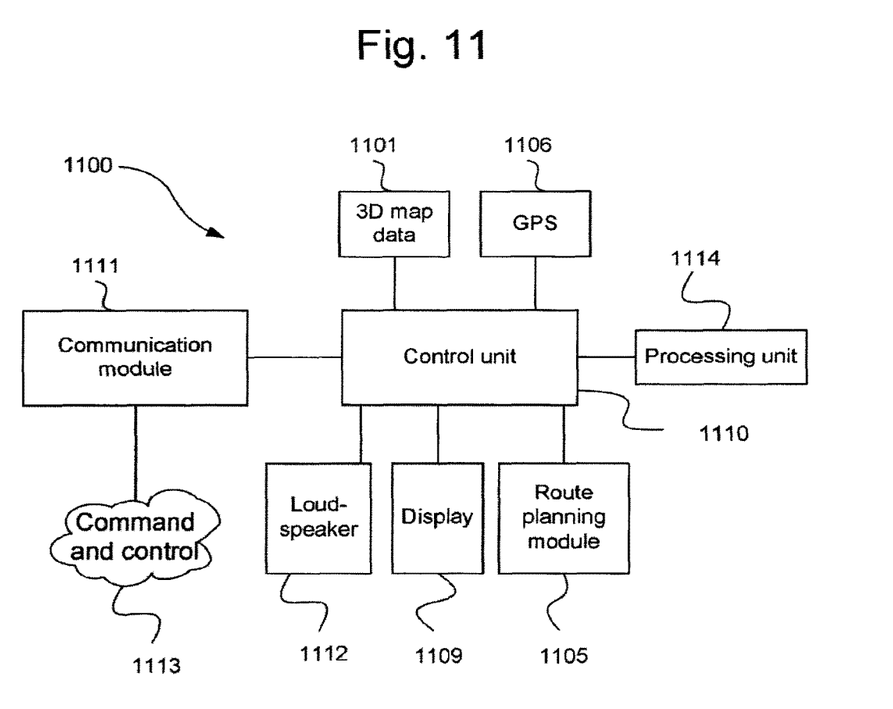
FIG. 11 is a block scheme illustrating an example of a system for providing knowledge about the environment.

In FIG. 11, the moving object is provided with a system 1100 for providing knowledge about the environment. In the illustrated example, the system comprises a communication module 1111 for communication with a command and control system 1113 supporting with information about hostile forces and their locations and movements, about areas with limited navigability etc. For example, some roads can carry less heavy vehicles and some roads may hold for heavier vehicles. Further, there may for example be flooded areas where no vehicle can pass.

Further, the system may comprise storage 1101 for a 3D map and a display 1109 for display of information extracted from said 3D map. The map is a 3D map comprising 3D coordinate data given in a georeferenced coordinate system. The 3D map may further be textured. The 3D map comprises a 3D model of the environment. The 3D model may comprise substantially all visible surfaces (above a certain size) in the environment seen from any angle. Thus, substantially all surfaces in the environment exceeding a certain size are associated to 3D coordinate data given in the georeferenced coordinate system. Further, also texture data may be associated to all surfaces in the environment exceeding a certain size. The geo-referenced coordinate data may comprise latitude data, longitude data and height data and may be associated to texture information. The data may have an accuracy of one or a few meters, preferably in the range of decimeters. In one example, the accuracy is one decimeter or higher. The required accuracy in the model depends on the size of the object moving in the terrain. To sum up, the 3D map provides a correct coordinates in a georeferenced coordinate system.

Figure 5:
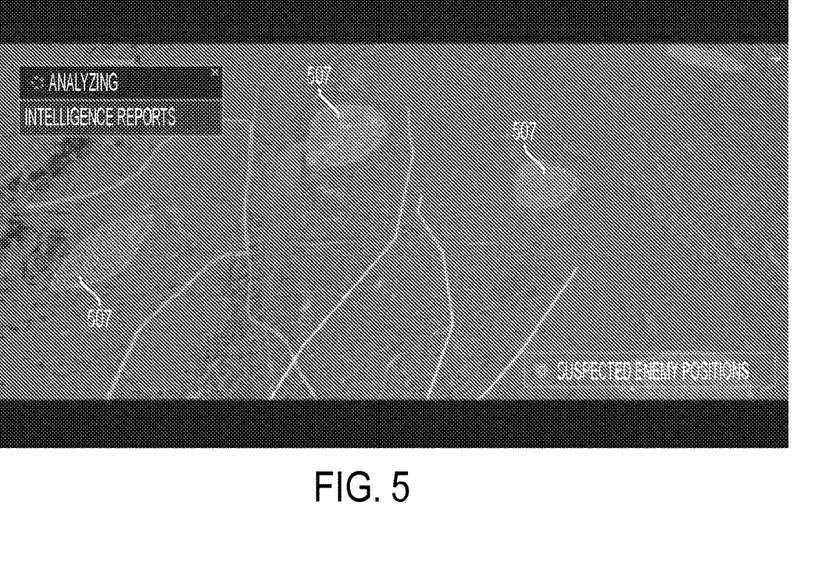
FIG. 5 illustrates identified threats marked in a 3D map of a terrain.

The display 1109 may be arranged to present 3D map data so as to support selection of a route which is as safe as possible. The 3D map presentation may also be used for visualizing information related to identified or potential threats along the route as the moving object is moving along its route. In one example, identified threats reported in from the command and control system may be visualized in the 3D map. For example, areas related to locations of identified threats may be marked on the display 1109. Also audio equipment 1112 may be present which can alarm when the moving object is approaching an identified threat as reported from the command and control system. FIG. 5 illustrates a map with identified threats in the terrain.

Figure 6:
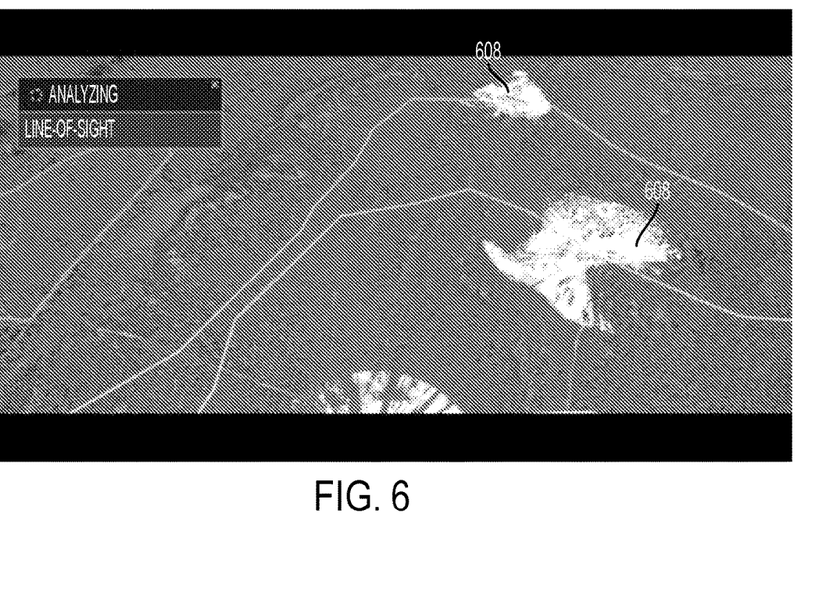
FIG. 6 illustrates potential threats marked in a 3D map of a terrain.

Further, the 3D map data may be processed in a processing unit 1114 based on the route of the moving object. The processing may then be performed so as to determine potential threats, i.e. areas in the terrain within reach for firing from hostile forces, where the moving object is visible during a time period long enough so that the potential hostile forces have time to aim and fire at the moving object. This processing is performed by estimating the route, if route data is not available, and based on this data perform line of sight calculations in the 3D map to find positions/zones from which the moving object is visible during a predetermined period long enough to perform aiming and firing. These areas may be marked in the 3D map presented by the display 1109 as potentially dangerous areas. Thus, the system 1100 for providing knowledge about the environment may provide essential information for enhancing the safety of a route of the moving object. FIG. 6 illustrates potential threats in association to a plurality of possible roads selections.

The object may be moving according to a pre-planned route. A system for route planning 1105 is arranged to be mounted onboard or in association to the moving object. The system for route planning has access to a GPS receiver 1106 and the above described 3D map data 1101, and accordingly to 3D map data associated to a region in which the route is intended to be performed.

Further, the system 1100 for providing knowledge about the environment comprises a control unit 1110. On one example, the control system is arranged to control the system to continuously follow the object as the object is moving. The system is arranged to use information received from a command and control system 1113 related to identified threats to alert for example via the display and/or the audio equipment when identified threats are approached. Further, the control unit 1110 may also be arranged to control processing so as to determine and alert about potential threats as the object travels forwards along its route. As described above, the determination of potential threats involves determining areas in the terrain within reach for firing from hostile forces, where the moving object is visible during a time period long enough so that the potential hostile forces have time to aim and fire at the moving object. Line of sight calculations may be used for determining the potential threats.

Characteristically, the object is moving according to a planned route to a destination. The system may have access to information related to the planned route. Further, the control unit 1110 may be arranged to receive instructions for example related to a new destination. The information related to the new destination may be received for example from the command and control system 1113. Alternatively, the new destination may be selected by way of manual input via a user interface (not shown). The route planning module 1105 may then be arranged to calculate at least one potential route to the destination. The route planning may be performed in at least two steps. In a first step, a plurality of available routes are determined based on the identified threat areas. Thereafter, a cost may be associated to each of the available routes. The cost may be based on the exposure to potential threats, i.e. exposure to areas in the terrain within reach for firing from hostile forces, where the moving object is visible during a time period long enough so that the potential hostile forces have time to aim and fire at the moving object. The cost may also be based on for example time constraints and/or terrain constraints and/or fuel constraints. In the case wherein a plurality of objects are travelling together, for example a convoy, the costs associated to each selectable route may be based on the fact that it is a whole convoy that is moving to the destination. In one example, the route planner may be arranged to evaluate the costs of separating the convoy into smaller groups taking different routes.

In one example, the route planner is arranged to present the available routes along with information related to the cost(s) for each route. The information presented related to costs could in one example comprise time to destination, time exposed to potential threats, closest distance to identified threat etc. One route can then be selected based on manual input. Alternatively, the route planning module 1105 is arranged to automatically select one route.

Figure 2:
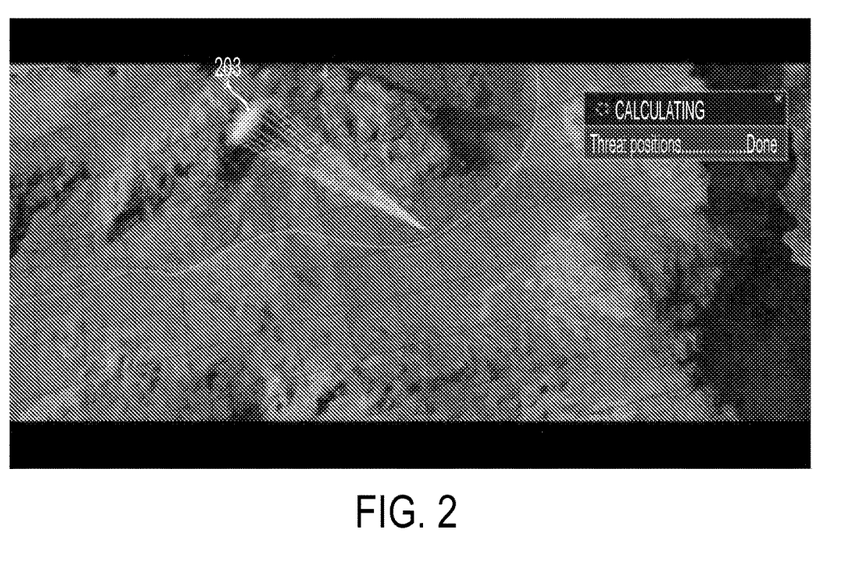
FIG. 2 illustrates a determined location a firer in the terrain.

In FIG. 2, a location or location zone 203 of a threat has been established. We will in this disclosure denote this threat as a firer. The term firer is intended to be interpreted broadly and include for example one single firer or a group of firers having small arms weapons or heavier weapons, one or a group of tankers or robots or an entire military set-up. The firer location has been identified based on line of sight calculations using information related to the 3D map and the present position of the object and its path during the predetermined time period and based on the assumption that the object has been visible to the firer substantially during the whole predetermined time period. Thus, these line of sight calculations have been used to identify one or a plurality of positions/zones from which the object has been visible during substantially the whole time period. If more than one position/zone has been identified based on the line of sight calculations, then additional information needs to be provided in order to identify from which position/zone the firing occurred. If no such information is available, then all locations/zones may be handled as a firing location/zone.

Figure 3:
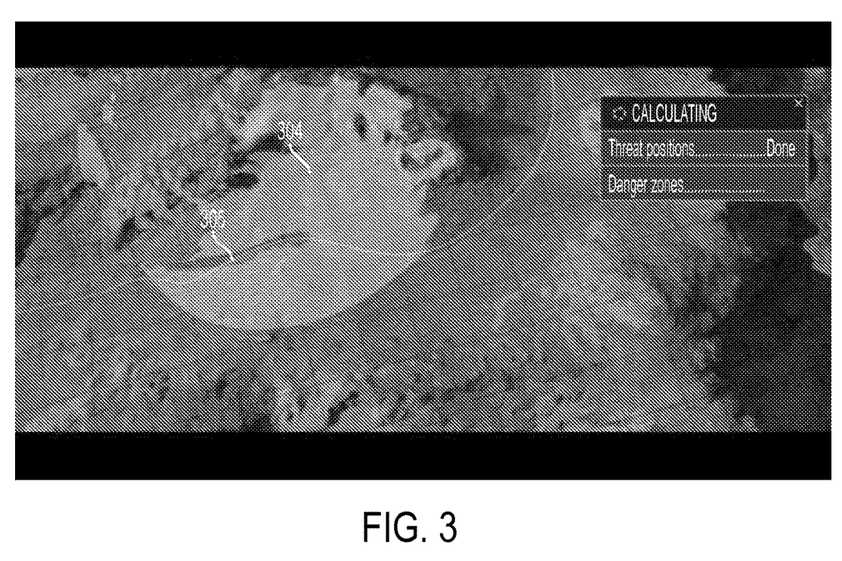
FIG. 3 illustrates a determined shooting area in the terrain.

In FIG. 3, line of sight calculations has again be used in the 3D map in order to determine a firing area 304 which can be reached by ammunition from the firer based on the identified location/zone 203 of the firer, Thus, in determining the firing area, the topology of the terrain can be accounted for by means of the 3D map. The line of sight calculations may be based on other line of sights than a straight line. For example, a line of sight formed as a ballistic trajectory of ammunition may be used. Further, information related to the range of information used by the firer may also be accounted for in determining the firing area. If no information about the ammunition is available, a preset range for the ammunition may be used in determining the firing area. Additional information of the firer may also be accounted for in determining the firing area, such as movability and/or ability of re-directing the weapon. As is seen in the figure, the route 305 of the object leads through the firing area 304.

Figure 4:
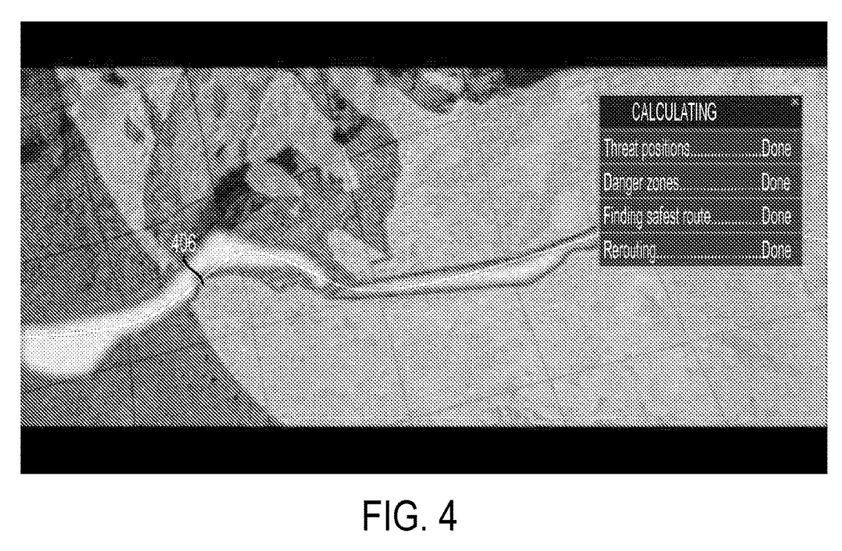
FIG. 4 illustrates a re-route around the shooting area.

In FIG. 4, reroute planning has been made so as to determine a path 406 or direction away from the threat based on the determined firing area.

In FIG. 5, the reroute planning comprises further finding alternative routes based on a plurality of identified threat areas 507.

In FIG. 6, a number of potential threat areas 608 has been determined based on the alternative routes and a cost has been associated to each alternative route. As described above, the potential threat areas are areas in which the object is within reach for firing and is visible for a longer time period than desirable.

Figure 7:
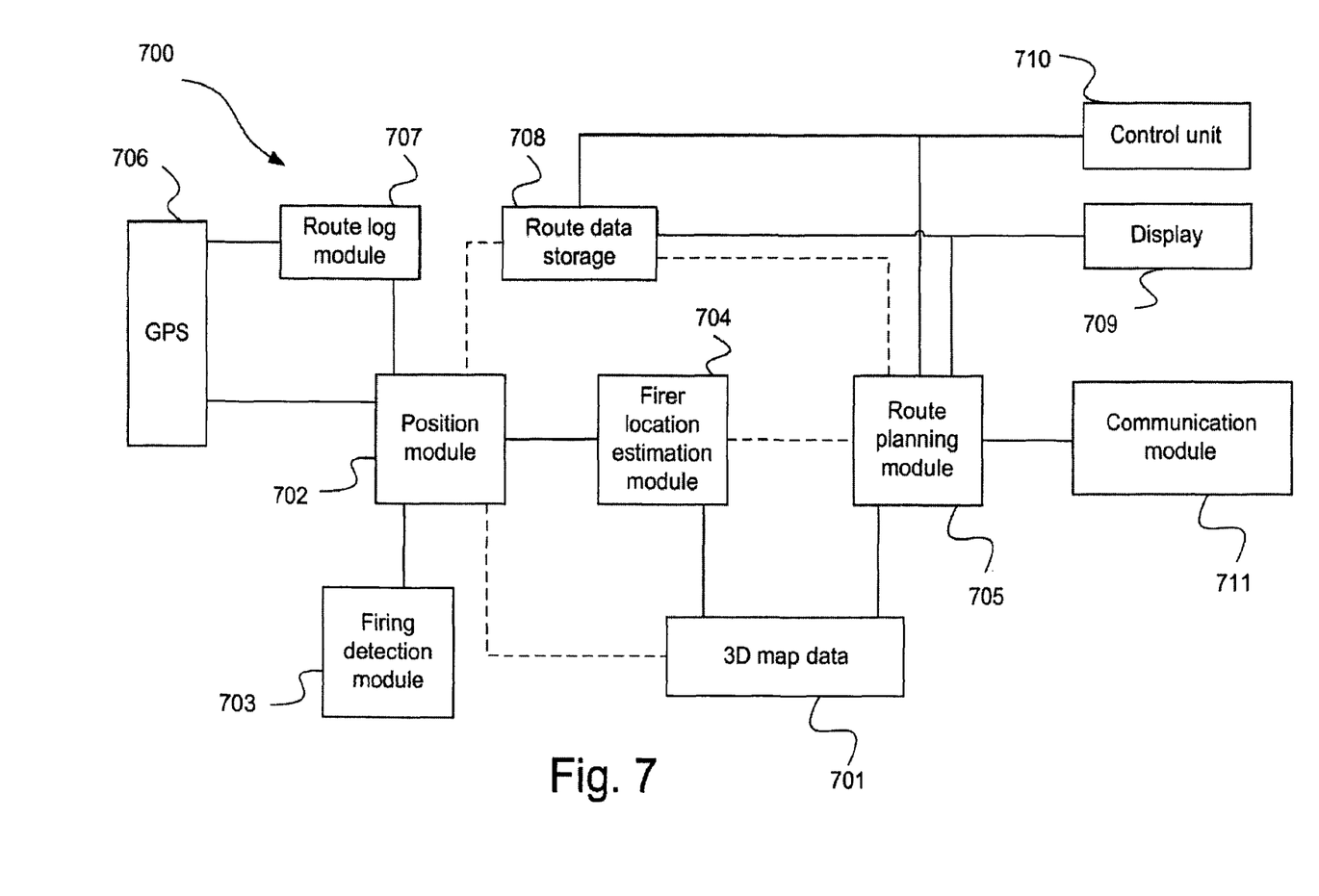
FIG. 7 is a block scheme for an example of a system for route planning.

In FIG. 7, a system for route planning 700 is arranged in association to an object such as a vehicle. The system is arranged to make re-route planning based on 3D map data 701 and based on line of sight calculations related to the route of the object within the terrain as illustrated by the map. The system may comprise among other things a position module 702, a firing detection module 703, a firer location estimation module 704, and a route planning module 705.

The position module 702 is arranged to register the present position of the moving object at request and to determine the travel path of the moving object during a predetermined time period preceding the request. The present position may represent a target position for firing. The request is generated upon fire detection. A GPS receiver 706 may be operationally connected to the position module. The GPS receiver 706 may be arranged to feed position and optionally also time information to the position module 702 at least upon request. Other types of receivers may be used instead of or in addition to the GPS receiver 706 for providing coordinate data in a geo referenced coordinate system to the position module 702.

The position module 702 is in one example operatively connected to a route log module 707. The route log module 707 records continuously the path of the moving object. At least records from within the predetermined time period are stored in the route log module 707. Alternatively, the whole or a major part of the route is stored in the route log module 707. In one example, the route log module 707 is arranged to store time referenced coordinate data in the geo-referenced coordinate system. In an alternative or complementary example, the position module 702 is arranged to determine the travel path of the moving object during a predetermined time period preceding the request by fetching route data from the route data storage 708 comprising route data for the planned route. The route data storage 708 may comprise optionally time referenced coordinate data comprising the coordinates for a destination, the start point and the route between the start point and the destination.

The firing detection module 703 is arranged to detect firing at the object. The firing detection module 703 may comprise a manually activated switch, button or the like. Upon activation, a request signal is fed to the position module 702. Alternatively or in addition thereto, the firing detection module 703 may comprise an automatic fire detection system automatically feeding the request signal to the position module 702 upon detection of firing. In an alternative example, the firing may be detected by a fire detection system. The automatic firing detection system may for example comprise a receiver for reception of audio signals, shock signals, image signals, radar signals, etc. A signal processor for processing of said audio signals, shock detection signals, image signals, and/or radar signals, is then arranged to determine if firing has occurred based on said signal(s). The firing detection module 703 may also be arranged to determine type of ammunition and/or weapon type for the fire. The signal processor may then, for example, be arranged to compare received characteristics signals with characteristics of a library of characteristics for different types of ammunition/weapons. Further, the signal processor for processing of said audio signals, shock detection signals, image signals, and/or radar signals may be arranged to localize firing based on said signal(s).

The firer location estimation module 704 is arranged to estimate the location of a firer based on the registered position and the determined travel path during the predetermined time period. In detail, the firer location estimation module 704 is arranged to perform line of sight calculations from each point of the path during the predetermined time interval including the present position in a 3D map comprising geo referenced coordinate data with high accuracy. The accuracy may be in the region of decimeters. Based in these line of sight calculations, locations or zones in the 3D map are determined from which the object has been visible at least during parts of the path during the predetermined time period.

The route planning module 705 may be arranged to plan a route of the object based on the determined location of the firer. The route planning module may be arranged to determine the route based on the danger of the firer and/or to plan the route so as to provide a re-planned route to the destination or a re-planned destination. Data related to the re-planned route may be stored in the route data storage 708.

The route planning module 705 is arranged to determine a firing area reachable from the estimated firer location based on the 3D map data 701 and line of sight calculations, and to plan the route so as to avoid said firing area. These line of sight calculations may be based on a line of sight formed as a straight line or for example a ballistic trajectory. If ammunition/weapon type has been detected by the firing detection module 703, then the route planning module 705 may be arranged to determine the firing area also based on this information. Based on the determined firing area and based on the 3D map data 701, a direction or path out of the firing area may be determined. This information may be feed to a display 709 or to a control unit 710 for control of the object.

The route planning module 705 is further arranged to determine a re-planned route to the destination or a re-planned destination and to feed data related to the planned or re-planned destination to the route data storage 708. In detail, the route planning module 705 is arranged to calculate a route to the planned or re-planned destination based on the 3D map data 701, wherein occasions of being visible from any point in the map during a second predetermined time period is minimized. The route planning module 705 may then be arranged to determine areas in the map in which the object will be exposed to a potential threat during a predetermined time period based on line of sight calculations, and determining a re-planned route avoiding said potential threat areas.

The system may comprise a communication module 711 arranged to transmit firing area data to other objects and/or to receive firing area data from other objects. If data has been received related to firing areas other than that/those detected by the system for re-planning of the object itself, this data should be taken into account in the re-planning. The route planning module 705 may also be arranged to determine safe areas in the 3D map in which the object will be exposed during a predetermined time period from a safe location in the map, and determining a re-planned route based also on said safe areas.

Figure 8:
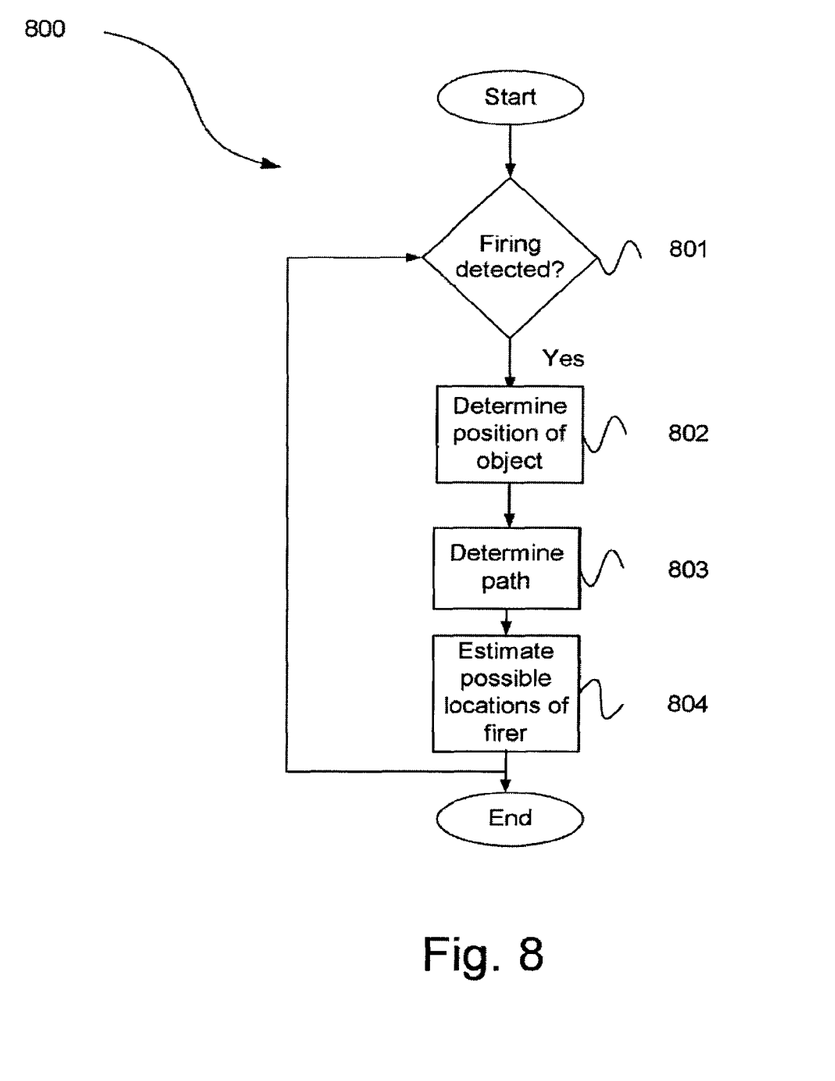
FIG. 8 is a flow chart illustrating an example of a method for determining the location of a firer.

In FIG. 8, a method for determining the location of a firer 800 comprises a first step of determining the position of an object 802 at the detection of firing against the object. The firing can in one example be detected by a person and thus the first step of the method may be manually activated. In an alternative example, the firing may be detected by a first detection system. In accordance with this example, the first step may be automatically activated. The firing detection system may for example be audible based, based on shock detection, or based on visual detection. A combination of said detection methods can also be used. In the first step, the position of the objects is in one example determined by receiving and registering a coordinate from a satellite based position system, such as a GPS.

In a second step, a plurality of positions for the object during a predetermined time period preceding detection of the firing are determined, to determine the path 803. In one example, the object arranged to log its route. The log comprises in one example time referenced position data. The time referenced position data may be received from a satellite based positioning system, such as GPS. In accordance with this example, the positions of the object during the predetermined time period are collected from the log during the second step. In an alternative example, route data is used for providing the positions of the object during the predetermined time period. The predetermined time period is in one example a preset value based on an estimated time for detecting the object and aiming a weapon. If information is available about type of weapon and/or ammunition, then the predetermined time period may be selected based on that information. In one example, the selection of the predetermined time period is based on information detected by the fire detection system.

In a third step, the possible locations of the firer are estimated 804 based on 3D map data 701 and based on the position of the object at the firing (determined in the first step 802) and the plurality of positions of the object during the predetermined time period preceding the firing determined in the second step 803. The location of the firer may be estimated from line of sight calculations based on the assumption that the object has been visible to the threat substantially during the whole predetermined time period. Thus, the estimation of the position of the firer involves finding one or a plurality of positions or zones from which line of sight has existed substantially during the whole predetermined time period. The first 802, second 803 and third 804 steps may be continuously updated during firing so as to refine the estimated possible locations of the firer.

Figure 9:
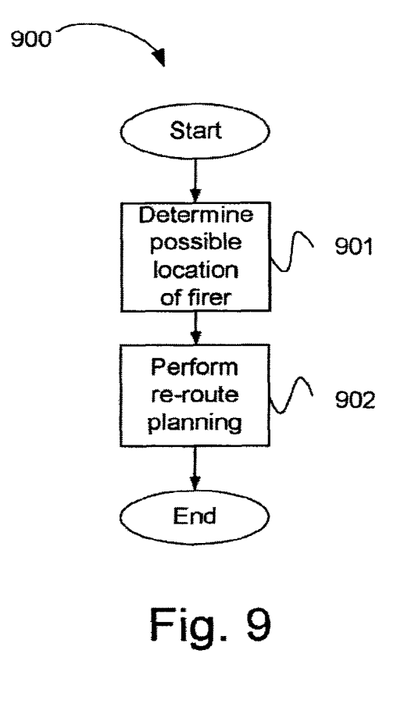
FIG. 9 is a flow chart illustrating an example of a method for route planning.

In FIG. 9, a method for re-route planning 900 for an object moving according to a route to a planned destination comprises the following steps. In a first step, the possible location of a firer is determined 901 based for example using the method as described in relation to FIG. 8. Thereafter re-route planning is performed 902 based on the determined possible location of the firer 901. The re-route planning comprises a selection of or all of the steps described below.

Figure 10:
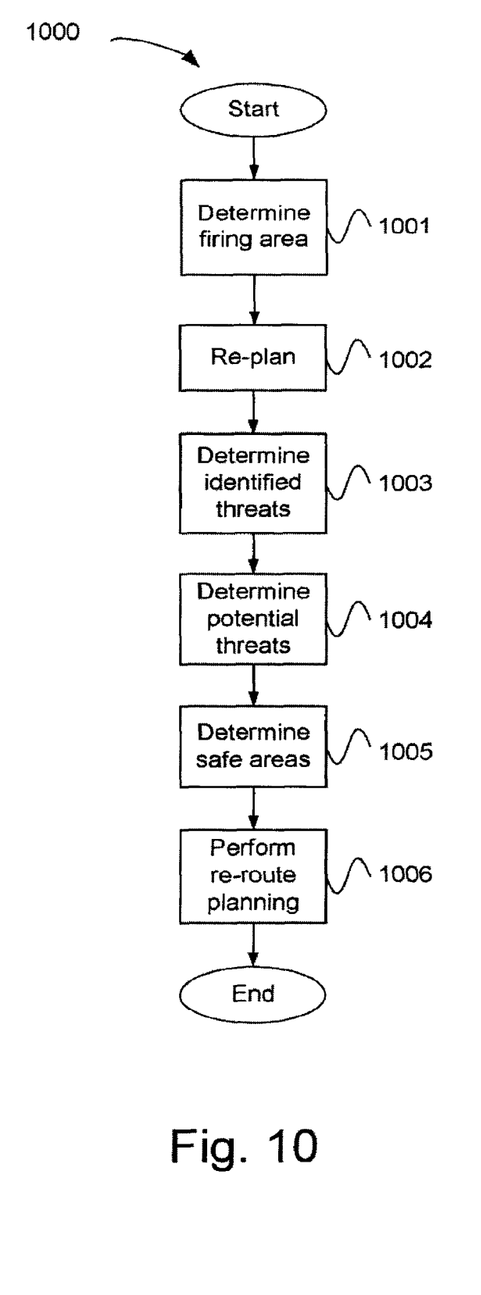
FIG. 10 is a flow chart illustrating an example of steps performed for re-planning a route.

In FIG. 10, the re-route planning 1000 first handles the threat from the detected firer. In a firing area determination step 1001, a firing area around the location of the firer is determined based on the 3D map data 701. Thus, this step may involve performing line of sight calculations from the location of firer based on the 3D map so as to provide the target area. The target area may be determined based on line of sight calculations in an area covering a full turn of 360° around the location of the firer. Alternatively, the target area may be determined based on line of sight calculations in an area covering a part of a turn around the location of the firer. In one example, the line of sight is defined as a straight line. In another example, the line of sight is defined by an imagined trajectory of the ammunition in use. For example for ballistic ammunition, the line of sight is defined by a ballistic trajectory.

Then, in a re-plan step 1002, the route is re-planned so as to find a route out of the firing area which is as safe as possible. In one example, a control system of the object is arranged to automatically control the object in a direction leading out of the firing area. This involves calculating the direction leading out of the firing area based on the extent of the firing area, based on physical constraints of the performance of the object, and optionally also based on the 3D map. In an extended example, the control system of the object is arranged to calculate a path leading out of the firing area and automatically control the object according to this path. Alternatively, the direction is presented so that the object can be manually controlled out of the firing area based on said presented direction. In an extended example, a complete trajectory can be presented so that the object can be manually controlled out of the firing area based on said path leading out of the firing area. In this step, it may be necessary to re-plan the destination for the route. If the re-routing to avoid the firing area takes the object to a position from which it is not advisable to go to an original destination, a new destination may be selected. This selection may for example be based on fuel consumption, travel distance and travel time to the destination.

When the intended destination has been established, the method for re-route planning comprises a step of determining identified threat areas 1003. In one example, wherein the re-route planning has not been caused by firing, the method may start in this step. In the step of determining identified threat areas 1003, a portion of the 3D map is selected, comprising the present position of the object and the destination. The information related to the threat areas may for example have been reported in as an intelligence report from command and control. Information related to threat areas can also be provided via communication from other objects as areas in which they have been exposed to firing, i.e. information related to threat areas correspond to the above described firing areas. The threat areas are associated to their locations in the selected portion of the 3D map. A number of available routes can then be determined based thereon. If no information is available related to threat areas, a number of available routes can be determined based on other criteria such as time to destination, fuel consumption, road conditions etc.

In a following step 1004, potential threats are identified. The potential threat areas are in one example identified as areas in the map in which the object will be exposed to a potential threat during a predetermined time period based on line of sight calculations in said 3D map. The alternative routes may then be evaluated based on said potential threat areas. The re-route planning 1006 comprises then calculating a route to said destination based on the 3D map and the potential threat areas in said 3D map so as to minimize occasions of being visible from any point in the map during a predetermined time period. The time period may be selected based on a number of reasons. For example, which type of object the moving object is, velocity of the object, information about whether the object travels alone or in a group or a convoy.

The re-route planning can be performed in other ways than the herein described, but generally avoidance of the threat areas has first priority and avoidance of the potential threat areas has second priority.

The calculation of the re-planned route may also comprise a step of determining safe areas 1005 in the map in which the object will be exposed during a predetermined time period from a safe location in the map. The re-planning step is then performed based also on said safe areas.

In the re-route planning step 1006 for planning the route to the destination, account may also be taken to terrain constraints such as hills, rivers, forests and/or other obstacles which may prevent the object from moving unhindered. Re-route planning may in addition to the above also be based on time constraints, fuel constraints and/or for minimize the length of the route.

The re-route planning step 1006 is in one example performed by forming a plurality of alternative routes based on the determined identified threat areas, potential threat areas and safe areas. One route may then be selected associated to a lowest cost, wherein the costs are determined based on at least some of the following criteria: determined identified threat areas; potential threat areas; terrain constraints such as hills, rivers, forests and/or other obstacles which may prevent the object from moving unhindered; time constraints; fuel constraints and/or for minimizing the length of the route.

Data associated to the re-planned route may then be fed to a system for control of the object. Alternatively, the data associated to the re-planned route or a plurality of available alternative routes may be presented on a display 709 for manual control of the object based on said presentation. The route may also be presented as coordinate data and control data for manual input to the control system.

A computer program for example arranged to be executed processing means of the system in FIG. 11 comprises a program code for re-route planning for an object moving according to a route to a planned destination. The computer program comprises the steps of determining potential threat areas (1004) in a 3D map in which the object will be exposed to a potential threat during a predetermined time period based on line of sight calculations, and determining a re-planned route based on said potential threat areas.

A computer program product may comprise a program code stored on a computer readable media for re-route planning for an object moving according to a route to a planned destination. The computer program is arranged to execute the steps of determining potential threat areas (1004) in a 3D map in which the object will be exposed to a potential threat during a predetermined time period based on line of sight calculations, and determining a re-planned route based on said potential threat areas, when said computer program is run on a computer.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. System for route planning configured to be mounted on a moving object, said system comprising:
   a three-dimensional (3D) map; and
   a route planning module configured to:
      re-plan at least one route of the moving object upon request;

determine a plurality of available routes based on identified threat areas and for each determined available route:
(a) performing line of sight calculations in the 3D map to find positions or zones from which the moving object is visible during a predetermined time period, the predetermined time period being long enough to perform aiming and firing at the moving object;
(b) determining and identifying one or more potential threat areas in the 3D map based on the line of sight calculations in the 3D map, wherein in each potential threat area the moving object is exposed to a potential threat from any of said positions or zones; and
(c) associating a cost with the route based on the corresponding at least one potential threat; and
automatically or manually select one of the plurality of available routes as the re-planned route based on the cost associated to each of the plurality of available routes.

2. System according to claim 1, wherein each potential threat area is at least one of a point or an area or a volume.

3. System according to claim 1, wherein the route planning module is further configured to:
determine safe areas in the 3D map in which the moving object will be visible from a safe location in the 3D map during the predetermined time while also not being exposed to the at least one potential threat during the predetermined time period from the safe location in the 3D map; and
determine the re-planned route further based on said safe areas.

4. System according to claim 1, wherein the moving object is a ground based object.

5. System according to claim 1, wherein the moving object is a vehicle.

6. System according to claim 1, wherein the route planning module is configured to re-plan the route based on the extent of a firing area and based on the 3D map data.

7. The system of claim 1, wherein to determine a re-planned route, the route planning module is configured to identify a destination for the re-planned route.

8. The system of claim 7, wherein the destination for the re-planned route is different from a planned destination of the planned route.

9. A computer-implemented method for re-route planning for an object moving according to a route to a planned destination, said method comprising the steps of:
retrieving, from one or more databases, data associated with a three-dimensional (3D) map;
determining a plurality of available routes based on identified threat areas and for each determined available route:
(a) performing, via one or more processing units, line of sight calculations in the 3D map to find positions or zones from which the moving object is visible during a predetermined time period, the predetermined time period being long enough to perform aiming and firing at the moving object;
(b) determining and identifying, via the one or more processing units, one or more potential threat areas in the 3D map based on the line of sight calculations in the 3D map, wherein in each potential threat area the moving object is exposed to a potential threat from any of said positions or zones; and
(c) associating a cost with the route based on the corresponding at least one potential threat; and
automatically or manually selecting one of the plurality of available routes as the re-planned route based on the cost associated to each of the plurality of available routes.

10. The computer-implemented method according to claim 9, wherein the calculation of the re-planned route comprises:
determining, via the one or more processing units, safe areas in the 3D map in which the moving object will be visible from a safe location in the 3D map during the predetermined time while also not being exposed to the at least one potential threat during the predetermined time period from the safe location in the 3D map; and
determining, via the one or more processing units, a re-planned route further based on said safe areas.

11. The computer-implemented method according to claim 9, wherein the re-route planning is based on terrain constraints that may prevent the moving object from moving unhindered.

12. The computer-implemented method according to claim 11, wherein the terrain constraints comprise at least one of hills, rivers, forests, or other obstacles.

13. The computer-implemented method according to claim 9, wherein the re-planned route is calculated based on time constraints.

14. A computer program product for re-route planning for an object moving according to a route to a planned destination, the computer program product comprising at least one non-transitory computer-readable storage medium having computer-readable program code portions stored therein, the computer-readable program code portions comprising at least one executable portion configured for:
re-planning at least one route of the moving object upon request;
determining a plurality of available routes based on identified threat areas and for each determined available route:
(a) performing, via one or more processing units, line of sight calculations in a three-dimensional (3D) map to find positions or zones from which the moving object is visible during a predetermined time period, the predetermined time period being long enough to perform aiming and firing at the moving object;
(b) determining and identifying, via the one or more processing units, one or more potential threat areas in the 3D map based on the line of sight calculations in the 3D map, wherein in each potential threat area the moving object is exposed to a potential threat from any of said positions or zones; and
(c) associating a cost with the route based on the corresponding at least one potential threat; and
automatically or manually selecting one of the plurality of available routes as the re-planned route based on the cost associated to each of the plurality of available routes.

* * * * *